(12) United States Patent
Haseltine

(10) Patent No.: US 10,228,564 B2
(45) Date of Patent: Mar. 12, 2019

(54) INCREASING RETURNED LIGHT IN A COMPACT AUGMENTED REALITY/VIRTUAL REALITY DISPLAY

(71) Applicant: Disney Enterprises, Inc., Burbank, CA (US)

(72) Inventor: Eric C. Haseltine, Silver Spring, MD (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 15/448,262

(22) Filed: Mar. 2, 2017

(65) Prior Publication Data

US 2017/0255017 A1    Sep. 7, 2017

Related U.S. Application Data

(60) Provisional application No. 62/303,141, filed on Mar. 3, 2016.

(51) Int. Cl.
| | |
|---|---|
| *G02B 27/01* | (2006.01) |
| *G02B 27/28* | (2006.01) |
| *G06F 1/16* | (2006.01) |
| *A63F 13/25* | (2014.01) |

(52) U.S. Cl.
CPC .......... *G02B 27/0172* (2013.01); *A63F 13/25* (2014.09); *G02B 27/0176* (2013.01); *G02B 27/283* (2013.01); *G02B 27/286* (2013.01); *A63F 2300/8082* (2013.01); *G02B 2027/0156* (2013.01)

(58) Field of Classification Search
CPC combination set(s) only.
See application file for complete search history.

(56) References Cited

U.S. PATENT DOCUMENTS

| | | | |
|---|---|---|---|
| 6,369,952 B1* | 4/2002 | Rallison | G02B 27/017 359/630 |
| 2013/0113973 A1* | 5/2013 | Miao | G09G 3/003 348/333.01 |
| 2014/0152531 A1* | 6/2014 | Murray | G06F 1/1632 345/8 |
| 2014/0240843 A1* | 8/2014 | Kollin | G02B 27/0172 359/633 |

(Continued)

*Primary Examiner* — Lixi C Simpson
(74) *Attorney, Agent, or Firm* — Patterson + Sheridan, LLP

(57) ABSTRACT

Implementations of an augmented reality (AR)-capable display device for displaying polarized light generated by a display onto a predefined field of view are disclosed herein. The display device comprises an optical arrangement having a predefined arrangement relative to a predefined position of the display and defining the field of view. The optical arrangement comprises a mirror element disposed within the field of view and at least partially transmissive of ambient light incident on a first surface and at least partially reflective of light incident on an opposite second surface, a polarized beam splitter element disposed within the field of view and closer to the second surface of the mirror element than the first surface, a half-wave plate element disposed between the polarized beam splitter element and the display and outside the field of view, and a quarter-wave plate element disposed between the polarized beam splitter element and the mirror element.

20 Claims, 6 Drawing Sheets

(56) References Cited

U.S. PATENT DOCUMENTS

| | | | |
|---|---|---|---|
| 2015/0309316 A1* | 10/2015 | Osterhout | G06F 1/163 345/8 |
| 2016/0109709 A1* | 4/2016 | Osterhout | G06F 3/03545 359/614 |
| 2016/0131903 A1* | 5/2016 | Kollin | G02B 27/0101 349/11 |
| 2016/0363770 A1* | 12/2016 | Kim | G02B 27/0172 |

\* cited by examiner

INCREASING RETURNED LIGHT IN A COMPACT AUGMENTED REALITY/VIRTUAL REALITY DISPLAY

CROSS-REFERENCE TO RELATED APPLICATIONS

This application claims benefit of U.S. provisional patent application Ser. No. 62/303,141, filed Mar. 3, 2016, entitled "INCREASING RETURNED LIGHT IN A COMPACT AUGMENTED REALITY/VIRTUAL REALITY DISPLAY", which is herein incorporated by reference in its entirety.

BACKGROUND

Field of the Disclosure

The present disclosure generally relates to computer-based entertainment, and more specifically to optical arrangements suitable for augmented reality (AR) and/or virtual reality (VR) devices.

Description of the Related Art

Computer graphics technology has significantly progressed since the first video games were developed. Relatively inexpensive 3D graphics engines now provide nearly photo-realistic interactive game play on hand-held video game, home video game, and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of visual sensing device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

SUMMARY

One embodiment described herein is an augmented reality (AR)-capable display device for displaying, onto a predefined field of view, polarized light generated by a display with a first polarization axis. The display device comprises an optical arrangement having a predefined arrangement relative to a predefined position of the display and defining the field of view. The optical arrangement comprises a mirror element having a first surface and opposite second surface, the mirror element disposed within the field of view and being at least partially transmissive of ambient light incident on the first surface and at least partially reflective of light incident on the second surface. The optical arrangement further comprises a polarized beam splitter element disposed within the field of view and closer to the second surface of the mirror element than the first surface, a half-wave plate element disposed between the polarized beam splitter element and the display and outside the field of view, and a quarter-wave plate element disposed between the polarized beam splitter element and the mirror element. The optical arrangement defines a first optical path from the display, through the half-wave plate element, to the polarized beam splitter element, through the quarter-wave plate element, to the second surface of the mirror element, through the quarter-wave plate element and through the polarized beam splitter element. The optical arrangement further defines a second optical path from the first surface of the mirror element through the quarter-wave plate element and through the polarized beam splitter element.

Another embodiment described herein is a system comprising a display configured to generate polarized light with a first polarization axis, and an optical arrangement having a predefined arrangement relative to a predefined position of the display and defining a field of view. The optical arrangement comprises a mirror element having a first surface and opposite second surface, the mirror element disposed within the field of view and being at least partially transmissive of ambient light incident on the first surface and at least partially reflective of light incident on the second surface. The optical arrangement further comprises a polarized beam splitter element disposed within the field of view and closer to the second surface of the mirror element than the first surface, a half-wave plate element disposed between the polarized beam splitter element and the display and outside the field of view, and a quarter-wave plate element disposed between the polarized beam splitter element and the mirror element. The optical arrangement defines a first optical path from the display, through the half-wave plate element, to the polarized beam splitter element, through the quarter-wave plate element, to the second surface of the mirror element, through the quarter-wave plate element and through the polarized beam splitter element. The optical arrangement further defines a second optical path from the first surface of the mirror element through the quarter-wave plate element and through the polarized beam splitter element.

Another embodiment described herein is an augmented reality (AR)-capable display device for displaying, onto a predefined field of view, polarized light generated by a display with a polarization axis. The display device comprises an optical arrangement having a predefined arrangement relative to a predefined position of the display and defining the field of view. The optical arrangement comprises a polarized beam splitter element disposed within the field of view and having the polarization axis, the polarized beam splitter configured to reflect a first portion of the polarized light; a polarized reflector disposed within the field of view; and a quarter-wave plate element disposed between the polarized beam splitter element and the polarized reflector, the quarter-wave plate element configured to transmit a second portion of the reflected first portion. The polarized reflector is configured to reflect a third portion of the transmitted second portion. The quarter-wave plate element is further configured to transmit a fourth portion of the reflected third portion. The polarized beam splitter element is further configured to transmit a fifth portion of the transmitted fourth portion.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of the disclosure and are therefore not to be considered limiting of its scope, for the disclosure may admit to other equally effective embodiments.

DETAILED DESCRIPTION

For implementations of an AR-capable and/or VR-capable display device including a display for displaying imagery, it is generally desirable to capture as much light emitted by the display as possible. In some implementations, such as those incorporating an external display device (such as a smartphone or other mobile computing device of a wearer), the display may be configured to produce polarized light. For the different types of polarization, it is possible to preserve a significant amount of polarized light emitted by the display by utilizing polarized beam splitter elements and/or polarized reflectors that maximize the amount of reflected and/or transmitted light at various stages.

Further, modularity and compatibility of the AR/VR-capable display device with various types of mobile computing devices are generally desirable features. However, since different models of smartphones can emit polarized light in different planes of polarization, an arrangement of a particular AR/VR-capable display device that is optimal for capturing polarized light from one type of mobile computing device may be less than optimal for capturing polarized light from another type of mobile computing device.

Figure 1:
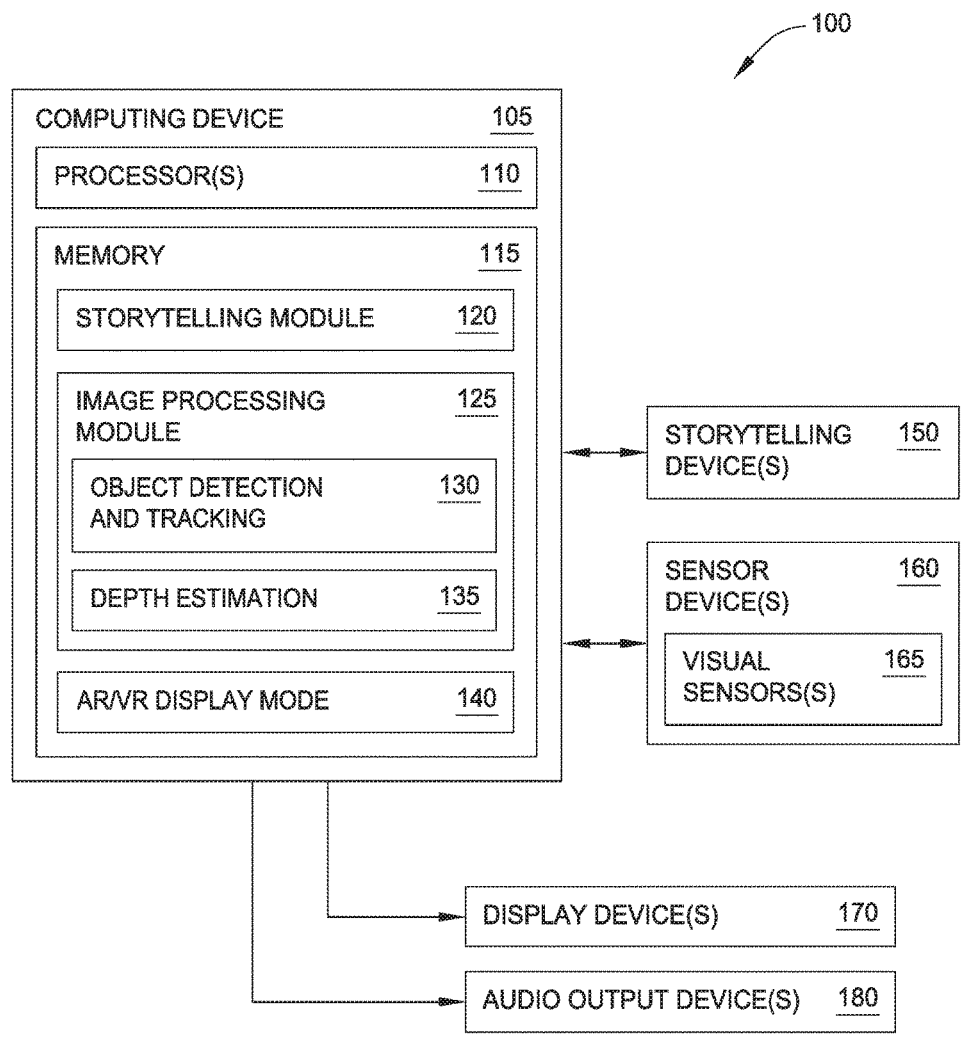
FIG. 1 illustrates an exemplary interactive environment, according to one embodiment.

FIG. 1 illustrates an exemplary interactive environment, according to one embodiment. Within a system 100, a computing device 105 communicates with one or more storytelling devices 150, one or more sensor devices 160, one or more display devices 170, and one or more audio output devices 180. As will be discussed in greater detail below, the computing device 105 may provide an augmented reality (AR) and/or virtual reality (VR) display functionality for a user in the interactive environment. The computing device 105 may be embodied in any suitable form. In some embodiments, the computing device 105 is a body-worn computing device, e.g., integrated into an assembly worn on the head, arm, etc. of a user. In some embodiments, the computing device 105 comprises a mobile computing device, such as a smartphone, tablet, etc. The mobile computing device may be configured to physically and removably attach with a body-worn assembly.

Computing device 105 comprises, without limitation, a processor 110 and memory 115. The processor 110 generally retrieves and executes programming instructions stored in the memory 115. Processor 110 is included to be representative of a single central processing unit (CPU), multiple CPUs, a single CPU having multiple processing cores, graphics processing units (GPUs) having multiple execution paths, and the like. The memory 115 is generally included to be representative of a random access memory, but may further include non-volatile storage of any suitable type(s).

Memory 115 generally includes program code for performing various functions related to generating and maintaining the storytelling environment. The program code is generally described as various functional "modules" within memory 115, although alternate implementations may have different functions and/or combinations of functions. Within memory 115, a storytelling module 120 is generally configured to generate a story using a selected predetermined story template (e.g., stored in memory 115), and based on a number of identified storytelling devices 150 that are available for participating in the storytelling experience. The storytelling devices 150 can be identified using a registration process performed by any suitable methods of communication. One non-limiting example includes a controller device (which may be a storytelling device 150 or the computing device 105) emitting a first signal such as an infrared (IR) signal, and other storytelling devices 150 transmitting a response signal such as a radio frequency (RF) signal in response to receiving the first signal.

The sensor devices 160 may be of any suitable type(s) and configured to sense information regarding the storytelling environment. Some non-limiting examples of sensor devices 160 include visual sensors 165, pressure sensors, acceleration sensors, and temperature sensors. The visual sensors 165 can include cameras configured to sense visible light and/or infrared light. In some embodiments, the sensor devices 160 may be included with (or within) the computing device 105. For example, where the computing device 105 is a smartphone or tablet device, the sensor devices 160 may include camera(s), inertial motion units (IMUs), etc. that included within the smartphone/tablet device. In some embodiments, the sensor devices 160 comprise sensors that are external to the computing device 105, e.g., a visual sensor 165 included with a head-worn device.

The memory 115 further includes an image processing module 125 configured to perform processing of visual information captured by visual sensors 165. The image processing module 125 may include any number of image processing functions, such as an object detection and tracking sub-module 130 configured to detect physical objects within the interactive environment (e.g., based on edge detection information, color information, and/or other suitable features) and to track the relative location of detected objects over time (e.g., as a user and/or the objects move throughout the interactive environment). The image processing module 125 further includes a depth estimation sub-module 135 configured to dynamically estimate a distance of the detected objects from the user.

The system 100 includes one or more display devices 170, and one or more audio output devices 180. The display devices 170 may include visual displays of any suitable type. The display devices 170 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. In some embodiments, the display devices 170 are included within the computing device 105 (e.g., a main display screen of the smartphone, tablet device, etc.). In other embodiments, the display devices 170 are separate from the computing device 105 but are configured to superimpose virtual imagery onto physical objects in the user's field of view. For example, the display devices 170 may be integrated into a body-worn device such as a headset, and the display devices 170 may be configured as an eyepiece or lens worn in front of the user's eye. In another example, the display devices 170 may be integrated into other devices that are carried or handled by the user, or having any other suitable user interaction during the storytelling experience. For example, while participating in the storytelling experience, the user can carry a toy blaster that includes an optical sight for aiming, and the display devices 170 may be integrated in the optical sight.

The audio output devices 180 may include conventional audio speakers having any suitable form factor (e.g., standalone, integrated in a stereo, headphones, etc.), as well as devices using alternative methods of producing sound perceptible by a user, such as bone conduction transducers in a body-worn device. In some embodiments, the audio output devices 180 are included within the computing device 105 (e.g., speakers of the smartphone, tablet device, etc.). In other embodiments, the audio output devices 180 are separate from the computing device 105. Some non-limiting implementations of the audio output devices 180 are shown in attached Appendix B.

In some embodiments, the computing device 105 is configured to operate in an augmented reality (AR) mode, generally configured to superimpose virtual images such as characters, objects, and/or dynamic visual effects into the user's natural field of view of the environment using a display device 170. The field of view of the user is generally determined using sensor devices 160 such as the visual sensors 165. In some embodiments, the computing device 105 is configured to operate in a virtual reality (VR) mode, generally replacing the user's natural field of view of the environment with virtual imagery using display device 170.

For example, the display device 170 could superimpose a virtual character to appear seated on a physical chair detected within the environment. The display of the virtual character on the display device 170 is dynamically adjusted based on the user's field of view (orientation), the determined depth of the chair from the user, and so forth.

In some embodiments, the computing device 105 is configured to dynamically select one of the AR mode and VR mode based on the sensed characteristics of the environment and/or based on the story generated by the storytelling module. The selection of the AR or VR modes is represented as AR/VR display mode 140 and included in memory 115. For example, the visual sensors 165 may detect that the environment is extremely bright (e.g., when the user is in direct sunlight), which may be difficult for a user to view overlaid information using the display device 170. In another example, a virtual setting of the story generated by the storytelling module 120 specifies a nighttime setting. In these examples, the VR mode may be enabled in order to substantially isolate the user's field of view from the surrounding physical environment and thereby reduce the amount of light received from the environment. In both cases, dynamic selection of the AR/VR display mode 140 can improve the immersive nature of the storytelling environment, whether through ensuring the user is able to suitably view the overlaid information or through providing a more realistic setting consistent with the virtual setting of the story.

Switching between AR and VR modes may be accomplished through any suitable techniques. In some embodiments, a user-worn headset includes a light-blocking assembly comprising cross polarizers that are disposed in front of each of the user's eyes. When one or both of the cross polarizers are rotated, the light from the physical environment that is transmitted to the user's eyes can be selectively reduced, and can substantially isolate the user's field of view from the physical environment (e.g., a VR mode). Rotating the cross polarizers may be performed manually (e.g., the user turns a knob linked with the cross polarizers), or electronically (e.g., a motor receives control signals from computing device 105 based on the AR/VR display mode 140 and rotates the cross polarizers. In other embodiments, the light-blocking assembly includes a partially or fully transparent "see-through" display, such as an OLED or side-lit or naturally lit LCD. The display receives control signals from computing device 105 based on the AR/VR display mode 140 and can selectively darken the display to substantially isolate the user's field of view from the physical environment.

The display devices 170 are generally used within system 100 to provide a compact AR/VR display that may be carried or worn by the user during the storytelling experience. As discussed above, the display devices 170 may include devices that are separate from the display device of a mobile computing device (e.g., a smartphone or tablet device). Implementations of the compact AR/VR display that use a smartphone or other mobile computing device offer several advantages. For example, implementations able to adapt the user's smartphone provide a reduced manufacturing cost of the compact AR/VR display, as no separate computing hardware or display hardware need be included. A camera included in the smartphone may be used as visual sensor 165 to dynamically provide information regarding the physical environment and the user's field of view. Using a smartphone may also provide increased convenience to the user, and may provide a relatively large display for viewing.

A number of considerations influence the design of a compact AR/VR display that uses a mobile computing device. Generally, the compact AR/VR display includes an optical arrangement that is configured to transmit some or all of the display of the mobile computing device to the user's eyes. Depending on the currently selected mode (AR or VR), the optical arrangement is further configured to transmit some or all of the light from the physical environment to the user's eyes. It may be beneficial to design a compact AR/VR display to have a relatively small size and weight. Smaller and lighter body-worn implementations allow for use by younger users or other users with reduced size and/or strength, and are generally less fatiguing during storytelling experience. The positioning of the mobile computing device and/or the optical arrangement can also be selected to reduce a moment on the user. For example, in a head-worn compact AR/VR display, including a smartphone in a position closer to the user's head provides a smaller moment (e.g., corresponding to strain on the neck or upper body) than an implementation in which the smartphone is positioned further from the user's head. A compact (small-sized) implementation also reduces manufacturing costs through reduced material and process requirements. A compact implementation may also be more aesthetically pleasing for users, when compared with a large or bulky implementation.

Using a mobile computing device in conjunction with an optical arrangement can provide the user a reasonably good field of view, which enhances the immersive nature of the interactive environment. Generally, the size of the user's field of view is proportional to size of the elements included in the optical arrangement for a particular distance from the user's eyes.

Figure 2:
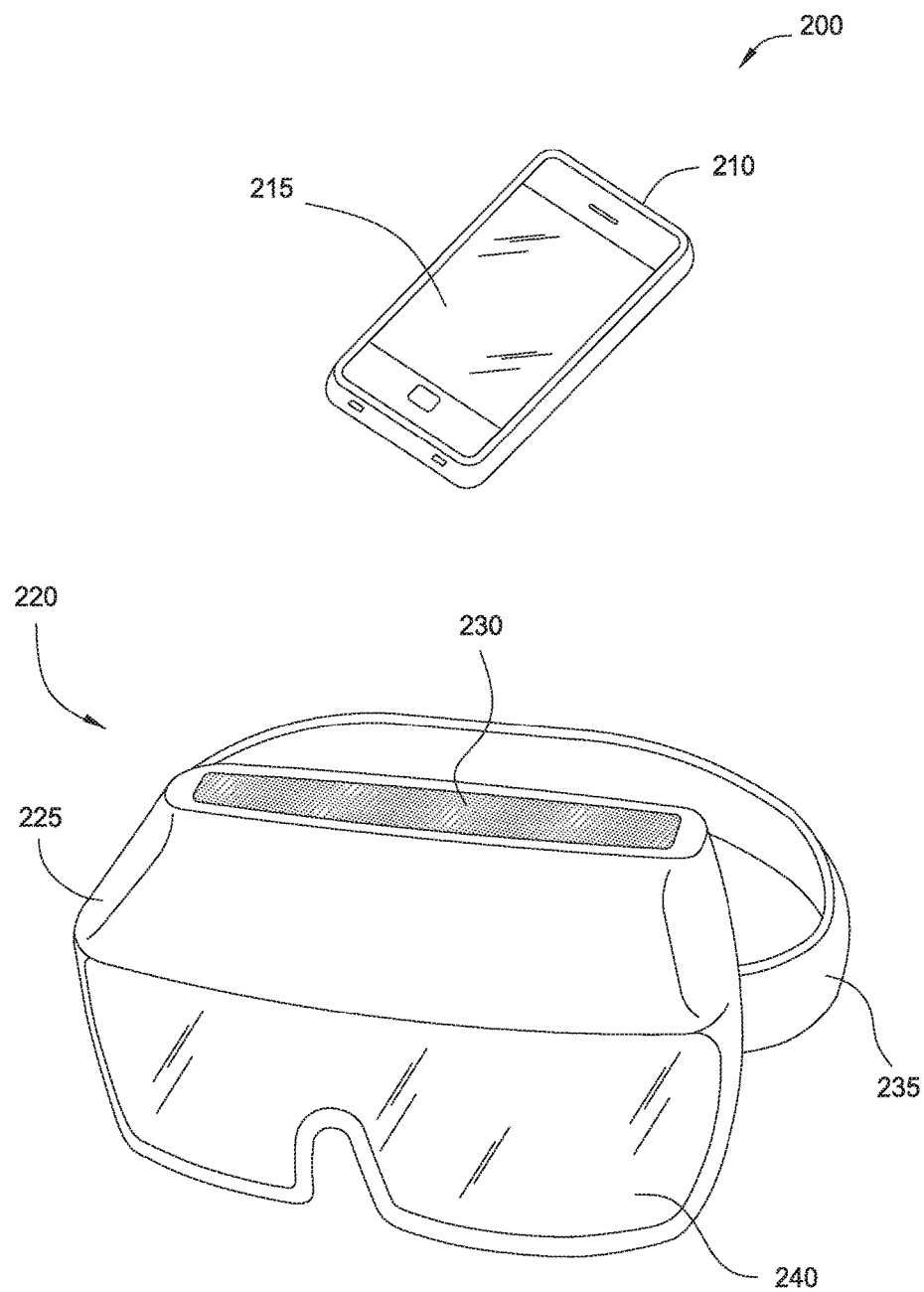
FIG. 2 is a diagram illustrating an AR/VR headset configured to interact with a mobile computing device, according to embodiments described herein.

FIG. 2 is a diagram illustrating an AR/VR headset configured to interact with a mobile computing device, according to embodiments described herein. As shown, the diagram 200 depicts a mobile computing device 210 and an AR/VR-capable display device in the form of an AR/VR headset 220. The AR/VR headset 220 generally includes a mount assembly 225 (or "mobile device adapter"), a headstrap 235, and a mirrored lens 240. The mount assembly 225 defines an opening 230 into which the mobile computing device 210 is received. Generally, insertion of the mobile computing device 210 into the opening 230 provides a removable attachment of the mobile computing device 210 with the mount assembly 225 and further arranges the display 215 (representing an example of the display device 170 of FIG. 1) with a predefined position. In the predefined position, the display 215 has a suitable orientation relative to optical components (not shown) included in the AR/VR headset 220. The mount assembly 225 may include any suitable means for removably attaching the mobile computing device 210. The mount assembly 225 is further configured to hold or retain the mobile computing device 210 with a desired position and orientation relative to a wearer of the AR/VR headset 220.

The light generated by the display 215 of the mobile computing device 210 (e.g., based on the display signals 175 of FIG. 1) is redirected through the optical components of the AR/VR headset 220 so that the light can be seen by a wearer of the AR/VR headset 220. For example, the generated light could pass through a beam-splitter and reflect off the mirrored lens 240 and into the wearer's eyes. Thus, virtual objects that are displayed using the display 215 appear as if present within the physical environment of the viewer. Advantageously, by leveraging the hardware resources of the mobile computing device 210, the AR/VR headset 220 can be produced and sold at reduced costs, relative to other AR devices containing dedicated computer processors, display devices, and so forth.

Figure 3:
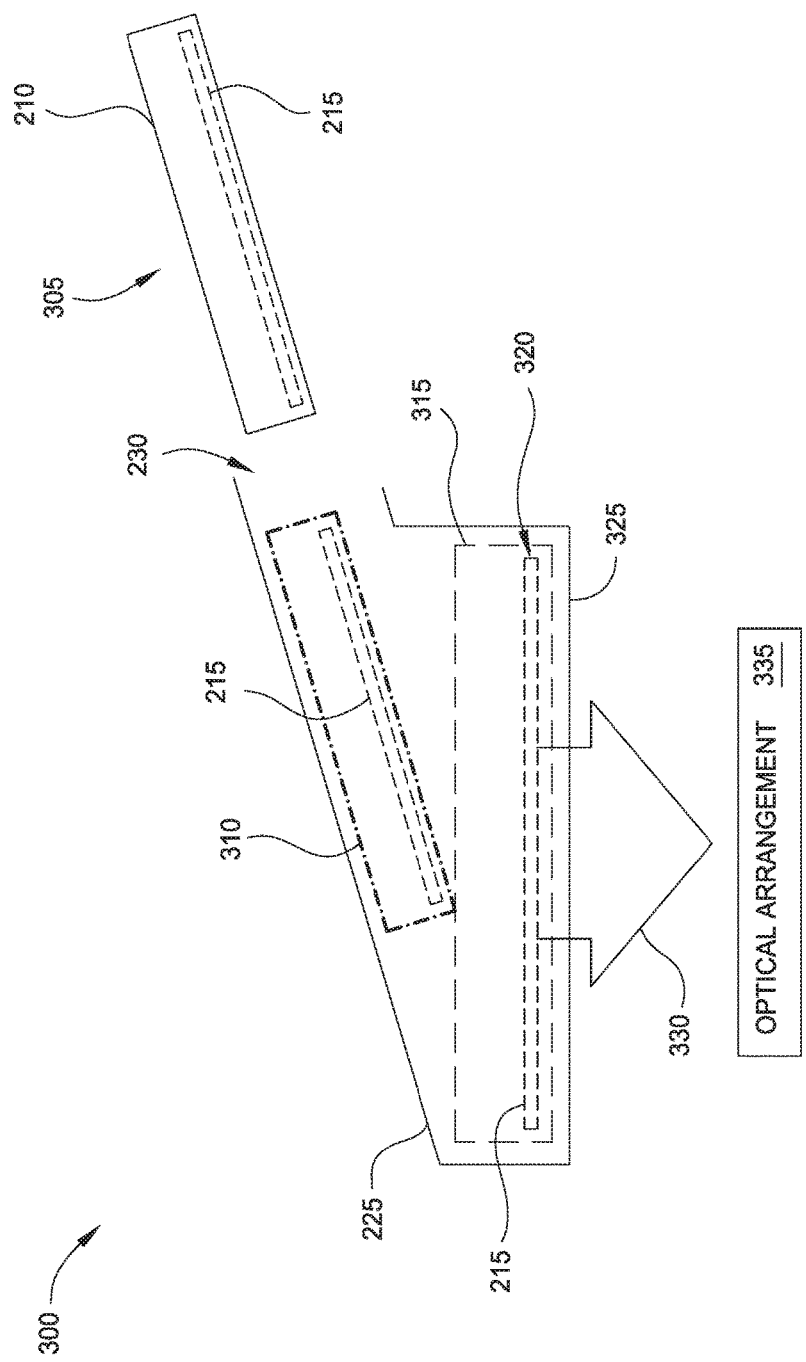
FIG. 3 is a diagram illustrating attachment of a mobile computing device with a mount assembly, according to embodiments described herein.

FIG. 3 is a diagram illustrating attachment of a mobile computing device with a mount assembly, according to embodiments described herein. More specifically, diagram 300 depicts an exemplary sequence for inserting the mobile computing device 210 into the mount assembly 225. The mount assembly 225 may be formed of one or more elements of any material having suitable strength for retaining the mobile computing device 210. In some embodiments, the mount assembly 225 is formed of a plastic material, which advantageously provides a lighter display device.

The mobile computing device 210 is inserted through an opening 230 formed in the mount assembly 225. The intermediate position 310 represents possible positioning of the mobile computing device 210 before reaching a predefined final position 315. At the predefined final position 315 of the mobile computing device 210, the display 215 of the mobile computing device 210 has a predefined position 320 relative to the optical arrangement 335.

A lower surface 325 of the mount assembly 225 is generally optically transmissive of light 330 generated by the display 215. In some embodiments, the lower surface 325 is formed of an optically transmissive material, such as a plastic or glass, through which light 330 from the display 215 is transmitted. In other embodiments, the lower surface 325 defines an opening through which light 330 from the display 215 is transmitted. For example, the lower surface 325 may support the mobile computing device 210 around a periphery of the mobile computing device 210.

Although not explicitly shown, the mount assembly 225 may include further elements for removably attaching the mobile computing device 210 with the mount assembly 225. For example, a press fit may be formed between the mobile computing device 210 and mount assembly 225 using adjustable corner piece(s), a sliding tray with guide plug, toggle pin(s), a stepped slot, a replaceable tray, etc. For example, the mobile computing device 210 may be inserted into a replaceable tray or other suitable carrier member, which is then inserted to the mount assembly 225 to thereby arrange the display 215 with the predefined position 320. In this way, different carrier members may be used to accommodate different types of mobile computing devices 210 for a particular mount assembly 225.

The removable attachment of the mobile computing device 210 with the mount assembly 225 may have any suitable orientation within an associated display device. The elements of the optical arrangement 335 collectively define a field of view relative to a predefined optical reference point, and the display device is generally designed such that the eye(s) of the viewer is aligned with the optical reference point. To support an AR capability of the display device, the mobile computing device 210 and mount assembly 225 are generally disposed outside of the field of view to allow a viewer to observe the physical environment through the optical arrangement 335. For example, for a head-worn display device in which a line of sight of the viewer corresponds to the field of view of the optical arrangement 335, the mobile computing device 210 and mount assembly 225 may be positioned above, below, or to a side of the viewer's line of sight.

Exemplary Implementations of Compact AR/VR Display

Figure 4:
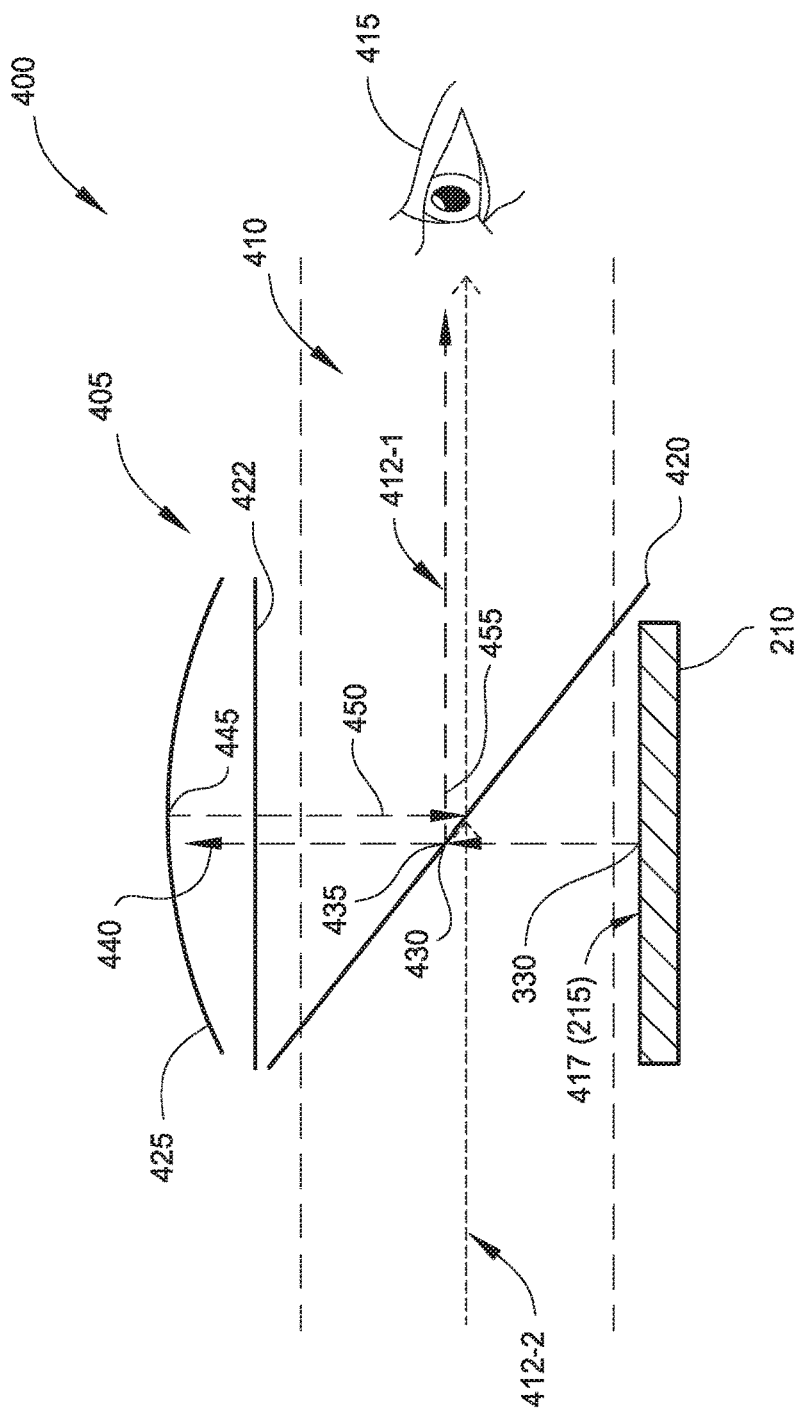
FIGS. 4-6 illustrate exemplary implementations of a compact AR/VR display device, according to embodiments described herein.

FIG. 4 illustrates an exemplary implementation of a compact AR/VR display device 400, according to one embodiment. The display device 400 illustrates a smartphone (i.e., one example of a mobile computing device 210) and an optical arrangement 405 that is configured to reflect at least a portion of light from the display 215 of the smartphone to an eye 415 of a viewer. The elements of the optical arrangement 405 collectively define a field of view 410 relative to a predefined optical reference point. The display device 400 is generally designed such that the eye 415 of the viewer is aligned with the optical reference point. Further, display device 400 generally provides greater recovery of the light 330 generated by the display 215, when compared with a similar display device implementation using non-polarized elements.

Although not shown, the optical arrangement 405 may include a mask that is configured to block light from some of the display area of display 215 and/or from other portions of the smartphone to prevent these portions from being seen by the viewer. For example, a mask may be provided to prevent the smartphone edges from being visible within the field of view 410, which tends to distract the viewer from the immersive nature of the interactive environment.

As shown, the mobile computing device 210 is arranged with its display 215 facing in an upward direction (that is, relative to the perspective of the viewer). In the various optical arrangements 405, 505, 605, etc. described herein, alternate orientations of the polarized display 215 relative to the viewer's perspective are also possible, such as downward-facing, sideways-facing, etc. In some embodiments, the smartphone is removably attached with the optical arrangement 405 in the display device 200, which may be body-worn or carried by the viewer. The removable attachment of the smartphone allows its display 215 to maintain a desired orientation with the elements of the optical arrangement 405 despite movement of the viewer during usage. Note that the structural elements attaching portions of the optical arrangement 405, the smartphone, and/or the viewer are not depicted for simplicity. For example, the display device 200 may include a flexible headstrap allowing comfortable wear by the viewer on his or her head. The light 330 (or "imagery") generated by the display 215 is transmitted in the upward direction towards a mirror element 425. In some embodiments, the mirror element 425 has a positive optical power and the imagery from the display 215 is typically focused between about 1 meter and optical infinity.

Within display device 400, the display 215 is a polarized display 417 generating imagery that is linearly polarized (whether in s-polarization or p-polarization), and the beam splitter element comprises a polarized beam splitter element 420 having a polarization axis aligned with the linearly polarized light 330. The optical arrangement 405 defines a first optical path 412-1 from the polarized display 417, through the polarized beam splitter element 420, through a quarter-wave plate element 422, to a surface of a mirror element 425, through the quarter-wave plate element 422, and to the polarized beam splitter element 420. The optical arrangement 405 further defines a second optical path 412-2 from one or more objects in the environment through the polarized beam splitter element 420.

Describing the first optical path 412-1 defined by optical arrangement 400 in another way, based on the linearly polarized light 330, a first incident light 430 is incident on the polarized beam splitter element 420. Because the linearly polarized light 330 from the polarized display 417 and the polarization axis of the polarized beam splitter element 420 are aligned, a first portion 435 that is transmitted by the polarized beam splitter element 420 comprises a majority of the linearly polarized light 330.

The first portion 435 passes through a quarter-wave plate element 422 (or "quarter-wave retarder"), which transforms the linear polarization of the first portion 435 into a circular polarization. The circularly polarized light is incident on the mirror element as second incident light 440, and a second portion 445 of the second incident light 440 is reflected off the mirror element 425. The reflected light passes through the quarter-wave plate element 422, which transforms the circularly polarized light into linearly polarized light with a net 90°-rotated polarization from the polarization axis of the polarized beam splitter element 420. A third incident light 450 is incident on the polarized beam splitter element 420, and a third portion 455 is reflected onto the field of view 410 by the polarized beam splitter element 420. The third portion 455 comprises a majority of the linearly polarized third incident light 450. In this way, losses are reduced at each incidence of the light on the polarized beam splitter element 420 (transmission and subsequent reflection). In some embodiments, the amount of the linearly polarized light 330 that reaches the viewer's eye 415 can be further increased by substituting a polarized reflector for the mirror element 425, such that a majority of the circularly-polarized second incident light 440 that is incident on the polarized reflector is reflected back (as second portion 445) through the quarter-wave plate element 422.

Although not shown, a camera of the smartphone may be included on an opposite surface from the display 215. The display device 400 may further include a second mirror element configured to reorient a sensing axis of the camera. In some embodiments, the camera senses in the forward direction corresponding to an axis of the field of view 410. In this orientation, the camera is able to acquire visual information for the environment for performing optical detection and tracking, depth estimation, and so forth. The second mirror element can be as simple as a single 90° fold mirror, or can be more complex including multiple mirrors and/or different mirror curvatures. In another implementation, the camera of the smartphone may be included on the same surface as the display 215.

Although not shown, the display device 400 further includes a light-blocking assembly disposed within the field of view 410. In some embodiments, the light-blocking assembly comprises cross polarizers. When one or both of the cross polarizers are rotated, the amount of light from the physical environment that is transmitted to the viewer's eyes (e.g., through the polarized beam splitter element 420) can be controlled to substantially isolate the field of view 410 from the physical environment (e.g., corresponding to a selected VR mode). Stated another way, the light-blocking assembly may be used to selectively isolate the optical path 412-2. Rotating the cross polarizers may be performed manually (e.g., the viewer turns a knob linked with the cross polarizers) or electronically. For example, a motor linked with the cross polarizers receives control signals from an associated computing device (such as the mobile computing device 210) and rotates the cross polarizers based on a selected AR or VR display mode. In other embodiments, the light-blocking assembly includes a partially or fully transmissive "see-through" display, such as an OLED or a side-lit or naturally lit LCD. In this case, the partially or fully transmissive display receives control signals from the associated computing device and selectively darkens the display based on the selected AR or VR display mode.

Figure 5:
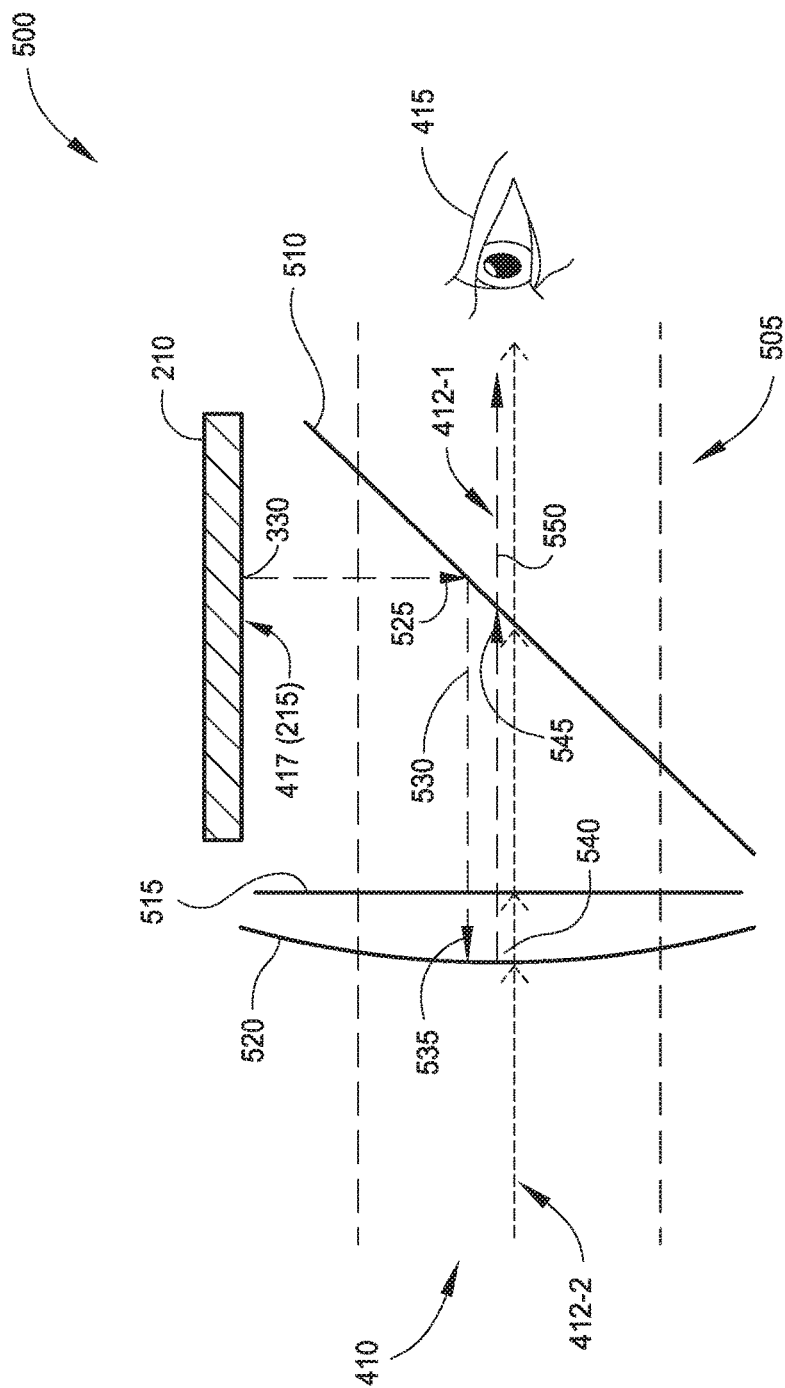

FIG. 5 illustrates an exemplary implementation of a compact AR/VR display device 500, according to one embodiment. Within display device 500, the display 215 comprises the polarized display 417 generating imagery that is linearly polarized (whether in s-polarization or p-polarization), and the optical arrangement 505 comprises a polarized beam splitter element 510 having a polarization axis aligned with the linearly polarized light 330. The optical arrangement 505 further comprises a quarter-wave plate element 515 having a vertical orientation (as shown) and disposed between the polarized beam splitter element 510 and a mirror element 520.

The optical arrangement 505 defines a first optical path 412-1 from the polarized display 417, to the polarized beam splitter element 510, through the quarter-wave plate element 515, to a surface of a mirror element 520, through the quarter-wave plate element 515, and through the polarized beam splitter element 510. The optical arrangement 505 further defines a second optical path 412-2 from one or more objects in the environment, through the mirror element 520, through the quarter-wave plate element 515, and through the polarized beam splitter element 510.

Describing the first optical path 412-1 defined by optical arrangement 505 in another way, within the field of view 410, the polarized beam splitter element 510 with the series combination of the quarter-wave plate element 515 and mirror element 520 are arranged such that most of the first incident light 525 having a first polarization is reflected by the polarized beam splitter element 510 (as second portion 530), and most of the third incident light 545 having a second polarization (e.g., a 90°-rotated polarization from the polarization axis of the beam splitter element 510) is transmitted by the polarized beam splitter element 510 (as third portion 550). In this way, losses are reduced at each incidence of the light on the polarized beam splitter element 510.

Generally, although the mirror element 520 has a positive optical power, the mirror element 520 does not distort or refocus the imagery as the thickness of the mirror element 520 is consistent. In other words, the mirror element 520 has a reflective optical power but does not have a refractive optical power. In one alternate embodiment, the mirror element 520 is polarized in order to further increase the amount of light reflected (i.e., the second portion 540) toward the polarized beam splitter element 510 and ultimately transmitted to the viewer.

Traditional beam splitter elements and partially reflective mirror elements pass only a percentage of incident light and reflect substantially the complementary percentage (i.e., transmitted light=100%—reflected light) of the incident light. For example, in a 50/50 beam splitter, half of the incident light is transmitted through the beam splitter while the other half is reflected. Such partially reflective surfaces lose a significant amount of energy with each reflection. For example, if light emitted by a display is reflected twice by 50% partially-mirrored surfaces, and transmitted once through a 50% partially-reflective beam splitter, approximately seven-eighths (⅞ or 87.5%) of the emitted light is lost and approximately one-eighth (⅛ or 12.5%) of the emitted light 330 is transmitted to the viewer's eye 415.

When the light emitted by a display is polarized, e.g., an LCD or an OLED display including a polarizer to reduce scatter and glare, it is possible to greatly increase the amount of light that reaches the viewer's eye by substituting the polarized beam splitter element 510 (e.g., a planar reflector) for a partially-reflective mirror beam splitter, and by including the quarter-wave plate element 515 between the polarized beam splitter element 510 and the mirror element 520 (e.g., partially reflective and concave). For example, in display device 500 of FIG. 5, the emitted polarized light 330 undergoes two quarter-phase shifts and one reflection, ultimately rotating the plane of polarization 90° so that the majority of light reflected from the mirror element 520 will pass through the polarized beam splitter element 510 to the viewer's eye 415. However, because this method employs a partially-reflective mirror coating on the mirror element 520, a fraction of the light 330 is still lost in proportion to the transmittance of this surface of the mirror element 520.

In some embodiments, a polarized reflective coating is applied to the front surface of the mirror element 520 to form a polarized reflector. Some non-limiting examples of the polarized reflector include a wire grid polarizer, interference polarizer, stack polarizer, or other reflective polarizer. The plane of polarization of the polarized reflector is oriented 90° with respect to the plane of polarization of the polarized beam splitter element 510.

A quarter-wave plate element 515 is disposed between the polarized beam splitter element 510 and polarized reflector. Polarized light 330 emitted by the polarized display 215 is efficiently reflected by the polarized beam splitter element 510, and the polarization is rotated via the quarter-wave plate element 515, such that the majority of light reflected by the polarized beam splitter element 510 on the first pass is returned with a 90° polarization shift and efficiently transmitted through the polarized beam splitter element 510 on the second pass to the viewer's eye 415. This efficiency results as the plane of polarization of light 330 from the polarized display 215, after the reflection off the polarized beam splitter element 510 and two passes through the quarter-wave plate element 515, will have been oriented along the plane of maximum transmission for the polarizing beam splitter element 510.

Additionally, plane-polarized light 330 emitted from the polarized display 215 that is reflected at a first pass of the polarized beam splitter element 510 has its polarization altered by the quarter-wave plate element 515. As a result, a greater proportion of the plane-polarized light will be reflected by the plane-polarized concave polarized reflector formed using mirror element 520, as the polarized reflector has a plane of polarization orthogonal to that of the polarized beam splitter 510.

The implementation of display device 500 also increases the amount of light from background objects that is transmitted through the mirror element 520 and polarized beam splitter element 510 to the viewer's eye 415. When light from background objects passes through the polarized surface of the mirror element 520, the light becomes linearly polarized and the quarter-wave plate element 515 transforms the polarization of this light so that a larger percentage passes through the polarized beam splitter element 510. The net effect of adding the polarizing reflective surface to the mirror element 520, in combination with the quarter-wave plate element 515, is to significantly increase the amount of light that reaches the viewer's eye 415, both light 330 emitted from the display 215 and light from the background objects viewed through the optics of optical arrangement 505.

The implementation of display device 500 can recover a substantial portion of the light that would otherwise be lost when light reflected from the polarized beam splitter element 510 (i.e., second portion 530) is incident on the mirror element 520. Further, the transmission of ambient light from background objects is maximized, such that the combined light loss through the mirror element 520 and the polarized beam splitter element 510 is minimized.

For some types of polarized reflectors, it is possible to achieve increased brightness without requiring a separate quarter-wave plate element 515 to be disposed between the polarized beam splitter element 510 and the mirror element 520. For example, in a polarized reflector that uses a stack of quarter-wave elements having an alternating high index-low index pattern, the outermost quarter-wave element in the stack can act as a polarization rotator for the purpose of brightness enhancement. In this case, an optical axis of the stack of quarter-wave elements is oriented such that the stack optimally rotates the plane of polarization of incident light, which is subsequently reflected by the mirror element 520, such that a maximum amount of incident light is reflected by the mirror element 520 while increasing a percentage of background light that is transmitted through the mirror element 520.

Figure 6:
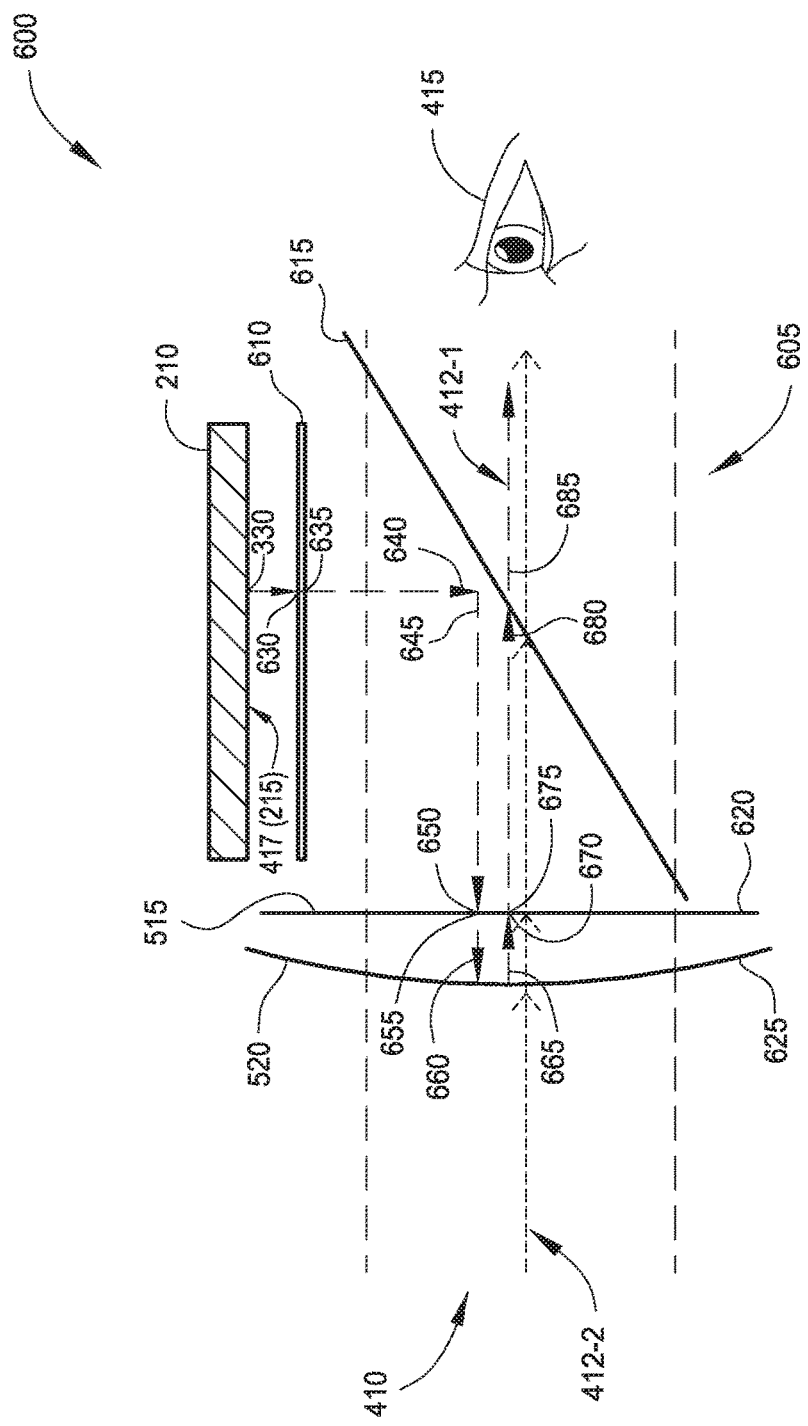

Note that although the optical arrangements of FIGS. 4-6 are shown relative to a single eye 415 of the viewer, implementations of the display device 400, 500, etc. can include independent optics for each eye of the viewer. Further, in some embodiments, implementations of the display device 400, 500, etc. may include some independent optics (e.g., one per eye) and some shared optics (e.g., one for both eyes). In one example, a single beam splitter element 420, 510 may be shared by two independent lens systems (e.g., two independent positive optical power mirrors) corresponding to the viewer's two eyes. Note additionally that alternative implementations of display device 400, 500, etc. may include one or more separate display devices (i.e., not included in the smartphone) and or one or more separate cameras (or other visual sensors). Further, the features described with respect to a particular implementation may be beneficially applied to other implementations without requiring an explicit recitation.

For implementations of a compact augmented reality (AR)/virtual reality (VR) display device, it is generally desirable to capture as much light emitted by the display as possible. In some implementations, such as those incorporating an external display device (such as a wearer's smartphone), the display is configured to produce polarized light. Some common types of polarization include linear, circular, and elliptical polarization. For each of these types of polarization, it is possible to preserve a significant amount of polarized light emitted by the display by utilizing polarized beam splitter elements and/or polarized reflectors that maximize the amount of reflected and/or transmitted light.

The embodiments illustrated in FIGS. 4 and 5 each include a polarized beam splitter element 420, 510 that is configured to reflect a substantial majority of polarized light emitted by a polarized display. In FIGS. 4 and 5, the polarized light emitted by the polarized display is transmitted a first time through a quarter-wave plate element 422, 515. The polarization-shifted light reflects from a partially-mirrored surface (i.e., mirror element 425 or 520) and is transmitted a second time through the quarter-wave plate element 422, 515. As a result of the two passes through the quarter-wave plate element 422, 515, the angle of polarization of the light is rotated 90° from the original display polarization so that the majority of the light is reflected off of (or transmitted through) the polarized beam splitter element 420, 510 to the viewer's eye 415.

Modularity and compatibility of the AR/VR display device with various types of mobile computing devices (e.g., smartphones) are generally desirable features. However, since different models of smartphones can emit polarized light in different planes of polarization, an arrangement of a particular AR/VR display device that is optimal for capturing polarized light from one type of smartphone may be less than optimal for capturing polarized light from another type of smartphone.

FIG. 6 illustrates an exemplary implementation of a compact augmented reality (AR)/virtual reality (VR) display device 600 ("display 600"), according to one embodiment. Generally, the display device 600 is configured to maximize the amount of light emitted by a polarized display that is transmitted to the viewer's eye, regardless of a type of the display or smartphone and/or a polarization of the display. The display device 600 illustrates a mobile computing device 210 having a polarized display 417, and an optical arrangement 605 that is configured to reflect a least a portion of light from the polarized display 417. However, the techniques discussed herein may apply similarly to separate polarized displays.

The optical arrangement 605 defines a first optical path 412-1 from the polarized display 417, through a half-wave plate element 610, to a polarized beam splitter element 615, through the quarter-wave plate element 515, to a first surface of a mirror element 520, through the quarter-wave plate element 515, and through the polarized beam splitter element 615. The optical arrangement 605 further defines a second optical path 412-2 from one or more objects in the environment to a second, opposing surface of the mirror element 520 through the quarter-wave plate element 515 and through the polarized beam splitter element 615.

Describing the first optical path 412-1 defined by optical arrangement 605 in another way, within display device 600, the polarized display 417 generates imagery (i.e., light 330) that is linear polarized with a first polarization axis (whether in s-polarization or p-polarization). The optical arrangement 605 includes a polarized beam splitter element 615. The first polarization axis of the polarized display 417 is oriented at 90° from a second polarization axis of the polarized beam splitter element 615. In optical arrangement 605, a half-wave plate element 610 (or "half-wave" retarder) is disposed between the polarized display 417 and the polarized beam splitter element 615. Based on the linearly polarized light 330, a first incident light 630 is incident on the half-wave plate element 610. The half-wave plate element 610 transmits a first portion 635 of the first incident light 630, where the first portion 635 has a plane of linear polarization that is rotated 90° from that of the first incident light 630. Because the first portion 635 is aligned along the second polarization axis, a majority of second incident light 640 that is incident upon the polarized beam splitter element 615 will be reflected by the polarized beam splitter element 615 as second portion 645.

The half-wave plate element 610 may be provided as a singular element (e.g., one half-wave plate element 610 used for a single eyepiece or for two eyepieces), or as multiple elements (e.g., a half-wave plate element 610 for each of the two eyepieces). The half-wave plate element 610 may have any suitable implementation, such as a removable planar insert for inserting into a corresponding slot formed in the display device 600, a removable decal that is removably attached with the polarized display 417 of the mobile computing device 210 by the user before inserting the mobile computing device 210 into the display device 600, and so forth. In this way, the half-wave plate element 610 allows the display device 600 to be compatible with various types of polarized displays 417 and/or mobile computing devices 210.

A third incident light 650 that is based on the second portion 645 is incident on a quarter-wave plate element 620. The quarter-wave plate element 620 is disposed in the field of view 410 between the polarized beam splitter element 615 and a mirror element 625, and operates to transform the linear polarization of the third incident light 650 into a circular polarization. A third portion 655 having the circular polarization is transmitted by the quarter-wave plate element 620. A fourth incident light 660 based on the third portion 655 is incident on the mirror element 625. In some embodiments, the mirror element 625 comprises a positive power mirror, which may be 100% front surface coated to reflect substantially all of the fourth incident light 660. Alternative implementations of the mirror element 625 may have different reflectivity. In some embodiments, the front surface coating of the mirror element 625 is a polarized reflector, which ensures that a majority of the (circularly polarized) fourth incident light 660 is reflected.

A fourth portion 665 of the fourth incident light 660 is reflected by the mirror element 625. A fifth incident light 670 based on the fourth portion 665 is incident on the quarter-wave plate element 620. The quarter-wave plate element 620 is further configured to transmit a fifth portion 675 of the fifth incident light 670. The fifth portion 675 has a linear polarization with a net 90°-rotated polarization from the polarization axis of the polarized beam splitter element 615. The polarized beam splitter element 615 is further configured to transmit a sixth portion 685 of sixth incident light 680. With the rotated polarization, the sixth portion 685 transmitted by the polarized beam splitter element 615 comprises a majority of the sixth incident light 680. In this way, losses are reduced at each incidence of the displayed light on the polarized beam splitter element 615 (i.e., reflection of second incident light 640 and subsequent transmission of sixth incident light 680).

Generally, introducing the half-wave plate element 610 into display device 600 may shift the perceived color(s) of the emitted light 330 of the polarized display 417, due to birefringence and similar phenomena that reflect and/or transmit certain wavelengths of light better than other wavelengths. In some embodiments, color shifts can be compensated in the rendering of an image at the polarized display 417. For example, a yellowing tint caused by including the half-wave plate element 610 may be compensated by increasing blue values of the imagery (i.e., light 330) while slightly decreasing red and green values. In some embodiments, the compensation may be performed using information that indicates the brand and/or model of the polarized display 417 and/or mobile computing device 210 that is used in the display device 600, as each different type may have a distinct color space or color profile.

In the preceding, reference is made to embodiments of the disclosure. However, the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

Additional examples of storytelling devices and story management and creation techniques, as well as proximity detection techniques and communication protocols, are provided in the attached appendices.

While the foregoing is directed to embodiments of the present disclosure, other and further embodiments of the disclosure may be devised without departing from the basic scope thereof, and the scope thereof is determined by the claims that follow.

What is claimed is:

1. An augmented reality (AR)-capable display device comprising:
   a display configured to generate polarized light;
   one or more computer processors configured to:
   receive display data; and
   generate compensated display data for the display based on identification information indicating one or both of a brand and a model of the display; and
   an optical arrangement having a predefined arrangement relative to a predefined position of the display and defining a field of view, the optical arrangement comprising:
       a mirror element having a first surface and opposite second surface, the mirror element disposed within the field of view and being at least partially transmissive of ambient light incident on the first surface and at least partially reflective of light incident on the second surface;
       a polarized beam splitter element disposed within the field of view and closer to the second surface of the mirror element than the first surface;
       a half-wave plate element disposed between the polarized beam splitter element and the display and outside the field of view; and
       a quarter-wave plate element disposed between the polarized beam splitter element and the mirror element,
   wherein the optical arrangement defines a first optical path from the display, through the half-wave plate element, to the polarized beam splitter element, through the quarter-wave plate element, to the second surface of the mirror element, through the quarter-wave plate element and through the polarized beam splitter element, and
   wherein the optical arrangement further defines a second optical path from the first surface of the mirror element through the quarter-wave plate element and through the polarized beam splitter element.

2. The display device of claim 1, wherein the polarized beam splitter element is configured to reflect a majority of incident light received from the half-wave plate element, and wherein the polarized beam splitter element is further configured to transmit a majority of incident light received from the quarter-wave plate element along the first optical path.

3. The display device of claim 1, wherein the display is included in a mobile computing device, the display device further comprising:
   a mount assembly configured to removably attach with the mobile computing device to thereby arrange the display with the predefined position.

4. The display device of claim 3, wherein the half-wave plate element is removably attached to the display or to the mount assembly.

5. The display device of claim 1, wherein the mirror element is a polarized reflector configured to reflect a majority of light incident on the second surface via the first optical path.

6. The display device of claim 1, wherein the display comprises a liquid crystal display (LCD) or an organic light-emitting diode (OLED) display.

7. The display device of claim 1, further comprising:
   a light-blocking assembly disposed within the field of view, wherein the light-blocking assembly is configured to, within a predefined virtual reality (VR) display mode of the display device, substantially isolate the field of view from the physical environment.

8. A system comprising:
   a mobile computing device comprising:
       a display configured to generate polarized light,
       wherein the mobile computing device is configured to generate compensated display data for the display based on identification information indicating at least one of: a brand of the display, a model of the display, a brand of the mobile computing device, and a model of the mobile computing device; and
   an optical arrangement having a predefined arrangement relative to a predefined position of the display and defining a field of view, the optical arrangement comprising:
       a mirror element having a first surface and opposite second surface, the mirror element disposed within the field of view and being at least partially transmissive of ambient light incident on the first surface and at least partially reflective of light incident on the second surface;
       a polarized beam splitter element disposed within the field of view and closer to the second surface of the mirror element than the first surface;
       a half-wave plate element disposed between the polarized beam splitter element and the display and outside the field of view; and
       a quarter-wave plate element disposed between the polarized beam splitter element and the mirror element,
   wherein the optical arrangement defines a first optical path from the display, through the half-wave plate element, to the polarized beam splitter element, through the quarter-wave plate element, to the second surface of the mirror element, through the quarter-wave plate element and through the polarized beam splitter element, and
   wherein the optical arrangement further defines a second optical path from the first surface of the mirror element through the quarter-wave plate element and through the polarized beam splitter element.

9. The system of claim 8, wherein the polarized beam splitter is configured to reflect a majority of incident light received from the half-wave plate element, and wherein the polarized beam splitter element is further configured to transmit a majority of incident light received form the quarter-wave plate element along the first optical path.

10. The system of claim 8, further comprising:
a mount assembly configured to removably attach with the mobile computing device to thereby arrange the display with the predefined position.

11. The system of claim 10, wherein the half-wave plate element is removably attached to the display or to the mount assembly.

12. The system of claim 8, wherein the mirror element is a polarized reflector configured to reflect a majority of light incident on the second surface via the first optical path.

13. The system of claim 8, wherein the display comprises a liquid crystal display (LCD) or an organic light-emitting diode (OLED) display.

14. The system of claim 8, wherein the optical arrangement further comprises:
a light-blocking assembly disposed within the field of view, wherein the light-blocking assembly is configured to, within a predefined virtual reality (VR) display mode of the display device, substantially isolate the field of view from the physical environment.

15. An augmented reality (AR)-capable display device comprising:
a display configured to generate polarized light with a polarization axis;
one or more computer processors configured to:
receive display data; and
generate compensated display data for the display based on identification information indicating one or both of a brand and a model of the display; and
an optical arrangement having a predefined arrangement relative to a predefined position of the display and defining a field of view, the optical arrangement comprising:

a polarized beam splitter element disposed within the field of view and having the polarization axis, the polarized beam splitter configured to reflect a first portion of the polarized light;
a polarized reflector disposed within the field of view; and
a quarter-wave plate element disposed between the polarized beam splitter element and the polarized reflector, the quarter-wave plate element configured to transmit a second portion of the reflected first portion,
wherein the polarized reflector is configured to reflect a third portion of the transmitted second portion,
wherein the quarter-wave plate element is further configured to transmit a fourth portion of the reflected third portion, and
wherein the polarized beam splitter element is further configured to transmit a fifth portion of the transmitted fourth portion.

16. The display device of claim 15, wherein the second portion comprises a majority of the reflected first portion, and wherein the fifth portion comprises a majority of the transmitted fourth portion.

17. The display device of claim 16, wherein the third portion comprises a majority of the transmitted second portion.

18. The display device of claim 15, wherein the display is included in a mobile computing device, the display device further comprising:
a mount assembly configured to removably attach with the mobile computing device to thereby arrange the display with the predefined position.

19. The display device of claim 15, wherein the display comprises a liquid crystal display (LCD) or an organic light-emitting diode (OLED) display.

20. The display device of claim 15, wherein a plane of polarization of the polarized reflector is oriented 90° with respect to a plane of polarization of the polarized beam splitter.

* * * * *